United States Patent [19]

Boeckmann

[11] Patent Number: 5,015,223

[45] Date of Patent: May 14, 1991

[54] HOTSEAL JAWS AND CUTOFF KNIFE ASSEMBLY FOR PROCESSING THERMOPLASTIC FILM BAG MAKING MATERIAL

[75] Inventor: Hugo Boeckmann, Arlington Heights, Ill.

[73] Assignee: Zip-Pak, Incorporated, Northbrook, Ill.

[21] Appl. No.: 446,804

[22] Filed: Dec. 6, 1989

[51] Int. Cl.⁵ .................... B31B 23/16; B31B 23/64
[52] U.S. Cl. .................... 493/194; 493/199; 493/206; 493/470; 156/581; 156/583.1
[58] Field of Search ............ 493/193, 194, 199, 206, 493/207, 209, 213, 214, 341, 372, 470; 156/581, 583.1

[56] References Cited

U.S. PATENT DOCUMENTS

| Re. 29,362 | 8/1977 | Reid | 53/555 |
| 3,575,090 | 4/1971 | Hook | 493/194 |
| 3,770,543 | 11/1973 | Darabant | 83/564 |
| 4,010,063 | 3/1977 | Natter | 83/544 |
| 4,256,024 | 3/1981 | Carlisle | 493/343 |
| 4,304,615 | 12/1981 | Siegel | 156/73.3 |
| 4,355,494 | 10/1982 | Tilman | 53/416 |
| 4,617,683 | 10/1986 | Christoff | 493/214 |

Primary Examiner—William E. Terrell
Attorney, Agent, or Firm—Hill, Van Santen, Steadman & Simpson

[57] ABSTRACT

Thermoplastic film bag making material is processed between a hotseal jaw and cutoff knife assembly. The apparatus has complementary first and second jaws between which the material is received for sealing bag side edge areas of the bag making material. The first jaw has a groove and the second jaw has a cutoff knife for extension into the groove for separating the material into individual bags. A rubber anvil block is in a groove underlying a zipper of the bag material and the knife thrusts into the block and attains substantially straight edges in the bag cutoff. Improved end sealing of the zipper also results.

6 Claims, 1 Drawing Sheet

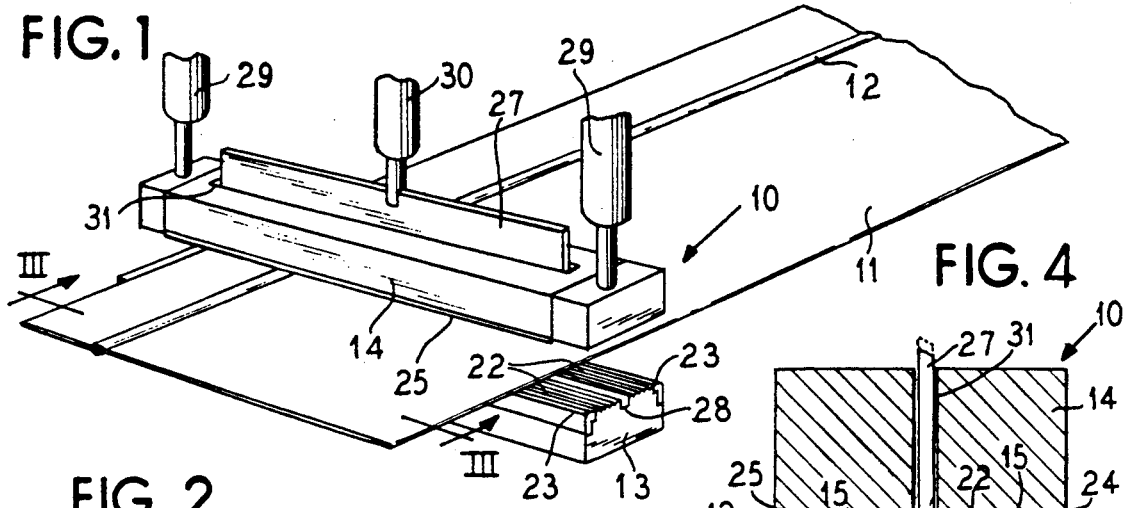
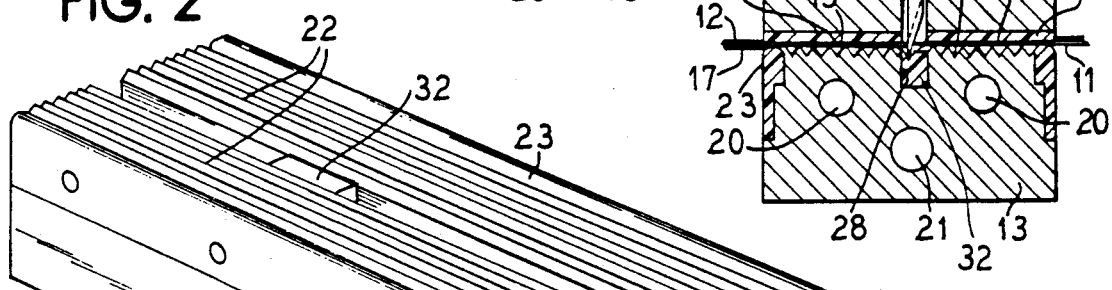
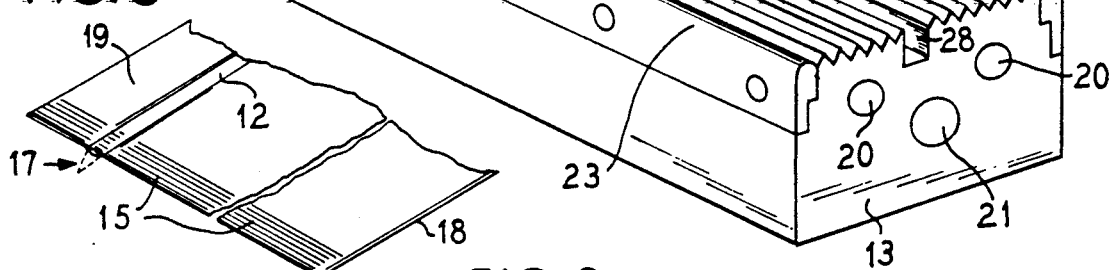
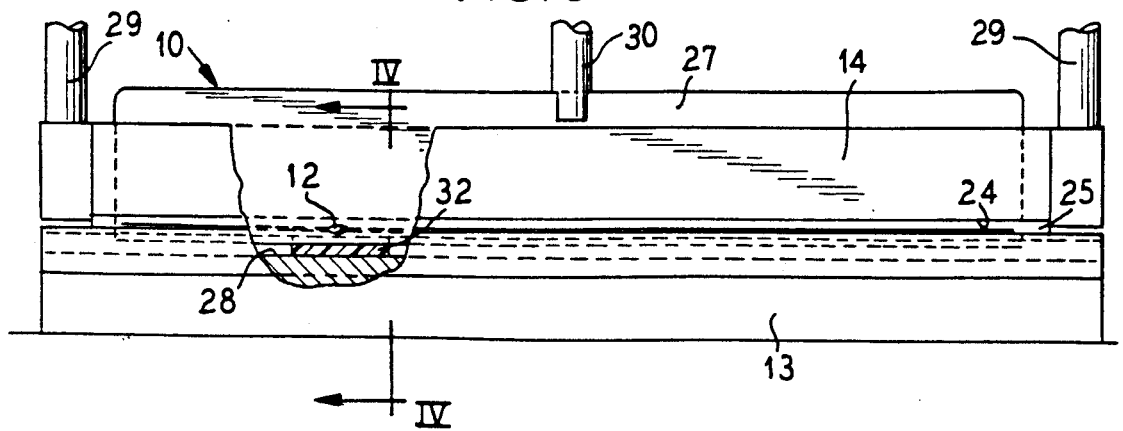

HOTSEAL JAWS AND CUTOFF KNIFE ASSEMBLY FOR PROCESSING THERMOPLASTIC FILM BAG MAKING MATERIAL

BACKGROUND OF THE INVENTION

The invention relates to a new and improved hotseal jaws and cutoff knife assembly for processing thermoplastic film bag making material, and is more particularly concerned with attaining substantially accurate cutoff at the end seals of reclosable plastic zipper carried by the material.

In such assemblies, the jaws are equipped to seal bag side areas of the bag making material. One of the jaws has a groove and the other of the jaws has a knife which extends into the groove for separating the material into individual bags. Although the bag making material is maintained taut between the jaws while the cutoff knife functions, there has been a roughness at the zipper end seal cutoff with a tendency toward leakage through the end seals of the zipper, as well as undesirable protrusion of zipper roughness at the end seals liable to cause damage to other bags during storage and shipment.

SUMMARY OF THE PRESENT INVENTION

An important object of the present invention is to overcome the foregoing and other problems, deficiencies and shortcomings heretofore experienced and to provide a new and improved method of and means for the present purpose.

Another object of the invention is to provide a new and improved hotseal jaws and cutoff knife assembly for processing thermoplastic film bag making material carrying reclosable plastic zipper and wherein during separating the bag making material into individual bags, smooth substantially accurate cutoff of the zipper is effected.

Another object of the invention is to provide a new and improved method of and means for eliminating leakage through the zipper end seals, and also avoiding protruding roughness at the end seals, when separating thermoplastic film bag making material carrying reclosable plastic zipper into individual bags.

To the attainment of the foregoing and other objects of the present invention, there is provided in a hotseal jaws and cutoff knife assembly for processing thermoplastic film bag making material carrying a reclosable plastic zipper, complementary first and second jaws between which the bag making material is received for sealing bag side edge areas of the bag making material, the first jaw having a groove and the second jaw having a cutoff knife for extension into the groove for separating the bag making material into individual bags, and resilient anvil means in the groove for underlying the zipper of the bag making material and against which the knife is thrustable, and thereby attaining substantially straight edges on the separated bag sides.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a more or less schematic perspective view of a hotseal jaws and cutoff knife assembly embodying the present invention;

FIG. 2 is an enlarged perspective view of one of the jaws of the assembly;

FIG. 3 is an elevational view taken substantially along the line III—III in FIG. 1 and partly broken away and in section to reveal details of structure;

FIG. 4 is a vertical sectional detail view taken substantially along the line IV—IV in FIG. 3; and FIG. 5 is a fragmentary perspective view of a bag side showing the end seal with a smoother transition at the bag side as attained by the present invention in contrast to prior rough, protruding end seals.

DETAILED DESCRIPTION

A hotseal jaws and cutoff knife assembly 10 (FIGS. 1, 3 and 4) for processing thermoplastic film bag making material 11 carrying a reclosable plastic zipper 12, comprises complementary first, herein lower, and second, herein lower, jaws 13 and 14 between which the bag making material 11 is received for sealing bag side areas 15 of the bag making material.

By "bag side" is meant either of the two sides of a bag 17 (FIGS. 4 and 5) and wherein the bag has, as is customary, opposite side walls defining a pouch space, a bottom end 18 and a top end 19 with the zipper 12 near but spaced below the top end which provides a mouth for access into the bag.

For effecting the sealing, the lower jaw 13 is heated by well known means, including heaters 20 and a thermocouple 21. A conventional generally sawtooth ribbed top face sealing surface 22 on the jaw 13 is flanked by gripper ribs 23 extending along each side of the sawtooth ribbed area of the top surface.

The upper jaw 14 has a flat lower sealing surface 24 carrying a resilient presser cushion pad facing 25 which is adapted to press the side areas 15 of the bag making material firmly into engagement with the sealing ribs 22 and the holding ribs 23 which assure that the side areas 15 will be held taut during the hotseal processing of the bag side areas.

Means for separating the bag making material 11 into individual bags 17 comprises a cutoff knife 27 associated with the jaw 14 and extensible into a groove 28 extending longitudinally centrally in and along the sealing surface of the jaw 13.

The jaw 14 is adapted to be cyclically reciprocated into sealing pressure coopertion with the jaw 13 and backed away from the jaw 13 by actuating means 29 comprising any preferred form of actuators which may be pneumatically driven and operatively attached to the opposite ends of the jaw 14. Actuating means 30 for operating the cutoff knife relative to the jaw 14 may also comprise a pneumatic actuator. Through this arrangement, the blade 27 can be reciprocated within a slot 31 in the jaw 14 to be raised into a clearance position as indicated in dash outline in FIG. 4 until the jaw 14 has been pressed into sealing engagement with the jaw 13 and the bag making material 11 is held taut by and between the ribs 23 of the lower jaw 13. Then the blade 27 is depressed into cutoff position projecting into the groove 28 and wherein the lead bag section 17 is separated from the succeeding bag section at substantially the same time that the side areas 15 of the bag sections are sealed.

In order to attain substantially straight edges on the bag sides, including the end seal cutoff of the zipper 12, a resilient anvil means 32 comprising a rubber block, is mounted in the groove 28 and positioned for underlying the zipper 12 of the bag making material, and against which the cutoff knife 27 is thrustable in each cutoff, bag separating stroke.

In a preferred form, both the resilient pressure pad 25 of the upper jaw 14 and the resilient anvil rubber block means 32, comprise a tough grade of silicone rubber which is unaffected by the sealing temperature of the jaws and particularly the lower jaw 13. The silicone rubber thoroughly withstands damage from repeated impacting by the clamping together of the jaws 13 and 14 with respect to the pressure pad 25 and impacting by the edge of the cutoff blade 27 with respect to the anvil block 32 which cooperates with the blade edge for attaining the substantially straight edge cutoff without roughness at the zipper end seals. By virtue of the zipper-underlying silicone rubber anvil 32, not only is improved sealing against leakage at the end seals attained but also freedom from roughness or protrusion at the ends seals as demonstrated by way of example in dot-dash in FIG. 5, in contrast to the smooth straight edge cutoff as shown in full line.

It will be understood that variations and modifications may be effected without departing from the spirit and scope of the novel concepts of the present invention.

What is claimed is:

1. A hotseal jaw and cutoff knife assembly for cutting individual bags from a continuous length and simultaneously seaming the edges of adjacent bags of a thermoplastic film having a pressure reclosable rib and groove zipper extending across the top of the bags, comprising in combination:

complementary first and second opposed jaws extending laterally of continuous longitudinally extending multilayered bag material having a continuous longitudinally extending zipper thereon and said film bag material being fed between the jaws so that the jaws can be brought together at spaced intervals along the bag material to form side seams on adjacent bags and sever the bags intermediate said seams;

the first jaw having a planar pressure pad of a resilient material and having a central opening extending parallel to the jaw;

a cutter knife reciprocal in said opening to move toward the second jaw to cut the material held between the jaws;

the second jaw having a roughened rigid planar face parallel to the face of the first jaw to firmly lock slippery film material therebetween;

heater means for heating the second jaw in its entirety;

and a lateral extending slot in the second jaw aligned with the slot in the first jaw having a strip of heat resistant rubber therein providing an anvil against which the knife moves for cutting the material as the jaws clamp and seal the layers of material to form side seams for adjacent bags separated by said knife;

said face pad and said roughened face accommodating and holding the thickness of said zipper preventing leaking between the material layers sealed together at the zipper.

2. A heated jaw and cutoff knife assembly for cutting individual bags from a continuous length and simultaneously seaming the edges of adjacent bags of a thermoplastic film having a pressure reclosable rib and groove zipper extending across the top of the bags constructed in accordance with claim 1:

wherein said first jaw includes means for moving it toward the second jaw to clamp material therebetween and said knife has means for moving the knife in the opening at the second jaw to cut the material.

3. A heated jaw and cutoff knife assembly for cutting individual bags from a continuous length and simultaneously seaming the edges of adjacent bags of a thermoplastic film having a pressure reclosable rib and groove zipper extending across the top of the bags constructed in accordance with claim 1:

including rounded gripper ribs at each side edge of the second jaw at the edges of the roughened jaw face having a rounded surface for gripping the layers of bag material at the edges of the second jaw.

4. A heated jaw and cutoff knife assembly for cutting individual bags from a continuous length and simultaneously seaming the edges of adjacent bags of a thermoplastic film having a pressure reclosable rib and groove zipper extending across the top of the bags constructed in accordance with claim 1:

wherein said roughened face of the second jaw is formed by ribs extending parallel to the jaw and preventing lateral movement of the material relative to the jaw as the knife cuts the material.

5. A heated jaw and cutoff knife assembly for cutting individual bags from a continuous length and simultaneously seaming the edges of adjacent bags of a thermoplastic film having a pressure reclosable rib and groove zipper extending across the top of the bags constructed in accordance with claim 1:

wherein said heater means is in the form of heater members embedded in the second jaw and extending therealong.

6. A heated jaw and cutoff knife assembly for cutting individual bags from a continuous length and simultaneously seaming the edges of adjacent bags of a thermoplastic film having a pressure reclosable rib and groove zipper extending across the top of the bags constructed in accordance with claim 1:

wherein said pressure pad of the first jaw and said heat of heat resistant rubber are each formed of a silicone rubber.

* * * * *